US006967454B1

(12) United States Patent
Braun

(10) Patent No.: US 6,967,454 B1
(45) Date of Patent: Nov. 22, 2005

(54) MONITORING APPARATUS AND METHOD FOR MONITORING A POLE CIRCUIT OF AN ELECTRICAL POWER CONVERTER

(75) Inventor: Dennis H. Braun, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/969,522

(22) Filed: Oct. 20, 2004

(51) Int. Cl.[7] ............................................... H02P 1/46
(52) U.S. Cl. ..................... 318/565; 318/563; 318/650; 318/806
(58) Field of Search ................................ 318/806, 565, 318/563, 650

(56) References Cited

U.S. PATENT DOCUMENTS

| 6,639,377 | B2 * | 10/2003 | Iwaji et al. ................. 318/700 |
| 6,720,751 | B2 * | 4/2004 | Plasz et al. ................. 318/567 |
| 6,788,024 | B2 * | 9/2004 | Kaneko et al. ............. 318/807 |
| 6,885,970 | B2 * | 4/2005 | Petrovic et al. ............ 702/169 |
| 6,903,523 | B2 * | 6/2005 | Peterson .................... 318/138 |
| 6,917,179 | B2 * | 7/2005 | Komatsu et al. ........... 318/700 |

* cited by examiner

Primary Examiner—Bao Q. Vu
(74) Attorney, Agent, or Firm—Quarles & Brady LLP; William R. Walbrun

(57) ABSTRACT

An apparatus monitors performance of a power inverter to detect malfunctions. A first signal indicates the direction that electric current exists between a first voltage bus and an output terminal of the power inverter. A second signal indicates the direction that electric current exists between a second voltage bus and the output terminal. A third signal indicates the direction that electric current occurs between the output terminal and a load. Other signals designate a commanded conductivity of switches that control the current within the power inverter. A controller analyzes the values of those signals to determine whether a malfunction has occurred.

20 Claims, 4 Drawing Sheets

SENSOR OUTPUT SIGNAL TABLE

| BIT PATTERN | BIT 1 | BIT 2 | BIT 3 | BIT 4 | BIT 5 | BIT 6 | BIT 7 | BIT 8 |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 0 | 1 |
| 2 | 0 | 0 | 0 | 0 | 0 | 0 | 1 | 0 |
| 3 | 0 | 0 | 0 | 0 | 0 | 1 | 0 | 0 |
| 4 | 0 | 0 | 0 | 0 | 0 | 1 | 0 | 1 |
| 5 | 0 | 0 | 0 | 0 | 0 | 1 | 1 | 0 |
| 6 | 0 | 0 | 0 | 0 | 1 | 0 | 0 | 0 |
| 7 | 0 | 0 | 0 | 0 | 1 | 0 | 0 | 1 |
| 8 | 0 | 0 | 0 | 0 | 1 | 0 | 1 | 0 |
| 9 | 0 | 0 | 0 | 1 | 0 | 0 | 0 | 0 |
| 10 | 0 | 0 | 0 | 1 | 0 | 0 | 0 | 1 |
| 11 | 0 | 0 | 0 | 1 | 0 | 0 | 1 | 0 |
| 12 | 0 | 0 | 0 | 1 | 0 | 1 | 0 | 0 |
| 13 | 0 | 0 | 0 | 1 | 0 | 1 | 0 | 1 |
| 14 | 0 | 0 | 0 | 1 | 0 | 1 | 1 | 0 |
| 15 | 0 | 0 | 0 | 1 | 1 | 0 | 0 | 0 |
| 16 | 0 | 0 | 0 | 1 | 1 | 0 | 0 | 1 |
| 17 | 0 | 0 | 0 | 1 | 1 | 0 | 1 | 0 |
| 18 | 0 | 0 | 1 | 0 | 0 | 0 | 0 | 0 |
| 19 | 0 | 0 | 1 | 0 | 0 | 0 | 0 | 1 |
| 20 | 0 | 0 | 1 | 0 | 0 | 0 | 1 | 0 |
| 21 | 0 | 0 | 1 | 0 | 0 | 1 | 0 | 0 |
| 22 | 0 | 0 | 1 | 0 | 0 | 1 | 0 | 1 |
| 23 | 0 | 0 | 1 | 0 | 0 | 1 | 1 | 0 |
| 24 | 0 | 0 | 1 | 0 | 1 | 0 | 0 | 0 |
| 25 | 0 | 0 | 1 | 0 | 1 | 0 | 0 | 1 |
| 26 | 0 | 0 | 1 | 0 | 1 | 0 | 1 | 0 |
| 27 | 0 | 1 | 0 | 0 | 0 | 0 | 0 | 0 |
| 28 | 0 | 1 | 0 | 0 | 0 | 0 | 0 | 1 |
| 29 | 0 | 1 | 0 | 0 | 0 | 0 | 1 | 0 |
| 30 | 0 | 1 | 0 | 0 | 0 | 1 | 0 | 0 |
| 31 | 0 | 1 | 0 | 0 | 0 | 1 | 0 | 1 |
| 32 | 0 | 1 | 0 | 0 | 0 | 1 | 1 | 0 |
| 33 | 0 | 1 | 0 | 0 | 1 | 0 | 0 | 0 |
| 34 | 0 | 1 | 0 | 0 | 1 | 0 | 0 | 1 |
| 35 | 0 | 1 | 0 | 0 | 1 | 0 | 1 | 0 |
| 36 | 0 | 1 | 0 | 1 | 0 | 0 | 0 | 0 |
| 37 | 0 | 1 | 0 | 1 | 0 | 0 | 0 | 1 |
| 38 | 0 | 1 | 0 | 1 | 0 | 0 | 1 | 0 |
| 39 | 0 | 1 | 0 | 1 | 0 | 1 | 0 | 0 |
| 40 | 0 | 1 | 0 | 1 | 0 | 1 | 0 | 1 |

FIG. 5A

SENSOR OUTPUT SIGNAL TABLE

| BIT PATTERN | BIT 1 | BIT 2 | BIT 3 | BIT 4 | BIT 5 | BIT 6 | BIT 7 | BIT 8 |
|---|---|---|---|---|---|---|---|---|
| 41 | 0 | 1 | 0 | 1 | 0 | 1 | 1 | 0 |
| 42 | 0 | 1 | 0 | 1 | 1 | 0 | 0 | 0 |
| 43 | 0 | 1 | 0 | 1 | 1 | 0 | 0 | 1 |
| 44 | 0 | 1 | 0 | 1 | 1 | 0 | 1 | 0 |
| 45 | 0 | 1 | 1 | 0 | 0 | 0 | 0 | 0 |
| 46 | 0 | 1 | 1 | 0 | 0 | 0 | 0 | 1 |
| 47 | 0 | 1 | 1 | 0 | 0 | 0 | 1 | 0 |
| 48 | 0 | 1 | 1 | 0 | 0 | 1 | 0 | 0 |
| 49 | 0 | 1 | 1 | 0 | 0 | 1 | 0 | 1 |
| 50 | 0 | 1 | 1 | 0 | 0 | 1 | 1 | 0 |
| 51 | 0 | 1 | 1 | 0 | 1 | 0 | 0 | 0 |
| 52 | 0 | 1 | 1 | 0 | 1 | 0 | 0 | 1 |
| 53 | 0 | 1 | 1 | 0 | 1 | 0 | 1 | 0 |
| 54 | 1 | 0 | 0 | 0 | 0 | 0 | 0 | 0 |
| 55 | 1 | 0 | 0 | 0 | 0 | 0 | 0 | 1 |
| 56 | 1 | 0 | 0 | 0 | 0 | 0 | 1 | 0 |
| 57 | 1 | 0 | 0 | 0 | 0 | 1 | 0 | 0 |
| 58 | 1 | 0 | 0 | 0 | 0 | 1 | 0 | 1 |
| 59 | 1 | 0 | 0 | 0 | 0 | 1 | 1 | 0 |
| 60 | 1 | 0 | 0 | 0 | 1 | 0 | 0 | 0 |
| 61 | 1 | 0 | 0 | 0 | 1 | 0 | 0 | 1 |
| 62 | 1 | 0 | 0 | 0 | 1 | 0 | 1 | 0 |
| 63 | 1 | 0 | 0 | 1 | 0 | 0 | 0 | 0 |
| 64 | 1 | 0 | 0 | 1 | 0 | 0 | 0 | 1 |
| 65 | 1 | 0 | 0 | 1 | 0 | 0 | 1 | 0 |
| 66 | 1 | 0 | 0 | 1 | 0 | 1 | 0 | 0 |
| 67 | 1 | 0 | 0 | 1 | 0 | 1 | 0 | 1 |
| 68 | 1 | 0 | 0 | 1 | 0 | 1 | 1 | 0 |
| 69 | 1 | 0 | 0 | 1 | 1 | 0 | 0 | 0 |
| 70 | 1 | 0 | 0 | 1 | 1 | 0 | 0 | 1 |
| 71 | 1 | 0 | 0 | 1 | 1 | 0 | 1 | 0 |
| 72 | 1 | 0 | 1 | 0 | 0 | 0 | 0 | 0 |
| 73 | 1 | 0 | 1 | 0 | 0 | 0 | 0 | 1 |
| 74 | 1 | 0 | 1 | 0 | 0 | 0 | 1 | 0 |
| 75 | 1 | 0 | 1 | 0 | 0 | 1 | 0 | 0 |
| 76 | 1 | 0 | 1 | 0 | 0 | 1 | 0 | 1 |
| 77 | 1 | 0 | 1 | 0 | 0 | 1 | 1 | 0 |
| 78 | 1 | 0 | 1 | 0 | 1 | 0 | 0 | 0 |
| 79 | 1 | 0 | 1 | 0 | 1 | 0 | 0 | 1 |
| 80 | 1 | 0 | 1 | 0 | 1 | 0 | 1 | 0 |

FIG. 5B

MONITORING APPARATUS AND METHOD FOR MONITORING A POLE CIRCUIT OF AN ELECTRICAL POWER CONVERTER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to apparatus which convert a DC supply voltage into an alternating voltage, and more particularly to power conversion equipment, such as power inverters used in motor drives that control electric energy supplied to an electric motor.

2. Description of the Related Art

Motor drives are commonly employed to control the application of electric energy to a three-phase induction motor. The motor drive includes a voltage source inverter which switches DC voltage to output lines in a pulse width modulated (PWM) manner so as to control the frequency and amount of voltage applied to the motor thereby controlling the motor speed.

In one type of an inverter, known as a two-level inverter, the output voltage waveform is formed by applying sequences of positive and negative voltage pulses to each terminal of the motor. For example, a three-phase, two-level inverter is made up of three poles. Each inverter pole comprises two semiconductor switches which selectively connect the respective phase output terminal to either a positive voltage bus or a negative voltage bus in order to produce the two voltage levels at that phase output terminal.

Any short term direct connection of the positive and negative voltage buses results in extremely high rate of current change, which if not detected in a very short time will cause severe overcurrent stress and eventual failure of a number of components in the direct path of the failure. Failure of a switch can result in damage to the switch, the pole, and other inverter components or to the motor. Therefore, it is desirable to detect such failures very quickly to be able to take prompt responsive action. Although current sensors have been located in the inverter output lines to the motor in order to regulate the current applied to the motor and to sense faults associated with output malfunctions, current sensors traditionally have not been placed elsewhere in the inverter branch circuits to detect malfunctions. Six or more additional current sensors would be needed in a three-phase inverter in order to detect failure of any one of the switching components.

Therefore, it is desirable to provide an improved apparatus and method for detecting malfunctions of a power inverter and providing diagnostic information that is useful in correcting the condition which lead to a malfunction.

SUMMARY OF THE INVENTION

A power converter includes a first switch which selectively connects a first voltage bus to an output terminal, and includes a second switch which selectively connects a second voltage bus to the output terminal. Performance of the power converter is monitored by an apparatus that comprises a first pole current sensor which produces a first indication denoting a direction of electric current between the first voltage bus and the output terminal. Preferably the first indication also designates when the electric current in a given direction exceeds a predefined threshold level. A second pole current sensor produces a second indication that denotes a direction of electric current between the second voltage bus and the output terminal. Here too, the second indication preferably designates when electric current in a given direction exceeds a predefined threshold level. An output current sensor is operably coupled to produce a third indication denoting direction of electric current in the output terminal.

Additional fourth and fifth indications are provided which respectively indicate whether the first and second switches are being commanded into a conductive or a non-conductive state.

A controller analyzes the first, second, third, fourth and fifth indications to detect when a fault condition occurs in the power converter. In a preferred embodiment, the controller implements a state machine in which the normal operation of the power inverter is defined by a plurality of states in a predefined sequence. Each state is associated with a specified pattern of the values of the first, second, third, fourth and fifth indications and a transition into a given state from a previous state in the sequence occurs when the specified pattern for the next state in the sequence exists. A fault condition is declared when an unexpected pattern of the values of the first, second, third, fourth and fifth indications is occurs.

Preferably the first, second, third, fourth and fifth indications each has three possible values, one indicating no electric current, another indicating electric current in one direction above a predefined threshold level, and the final value indicating electric current in the opposite direction above a predetermined threshold level. For example, each indication comprises two binary bits, which both are false when no current exists at the respective location and which have a true value depending on the direction of current that is present. The use of three indicator values rather than absolute current measurements simplifies the logical determination whether or not a fault condition exists.

BRIEF DESCRIPTION OF THE DRAWINGS

FIGS. 5A and 5B form a table of the reduced possible combinations of the binary output signals from the sensors for one pole or phase branch.

DETAILED DESCRIPTION OF THE INVENTION

Figure 1:
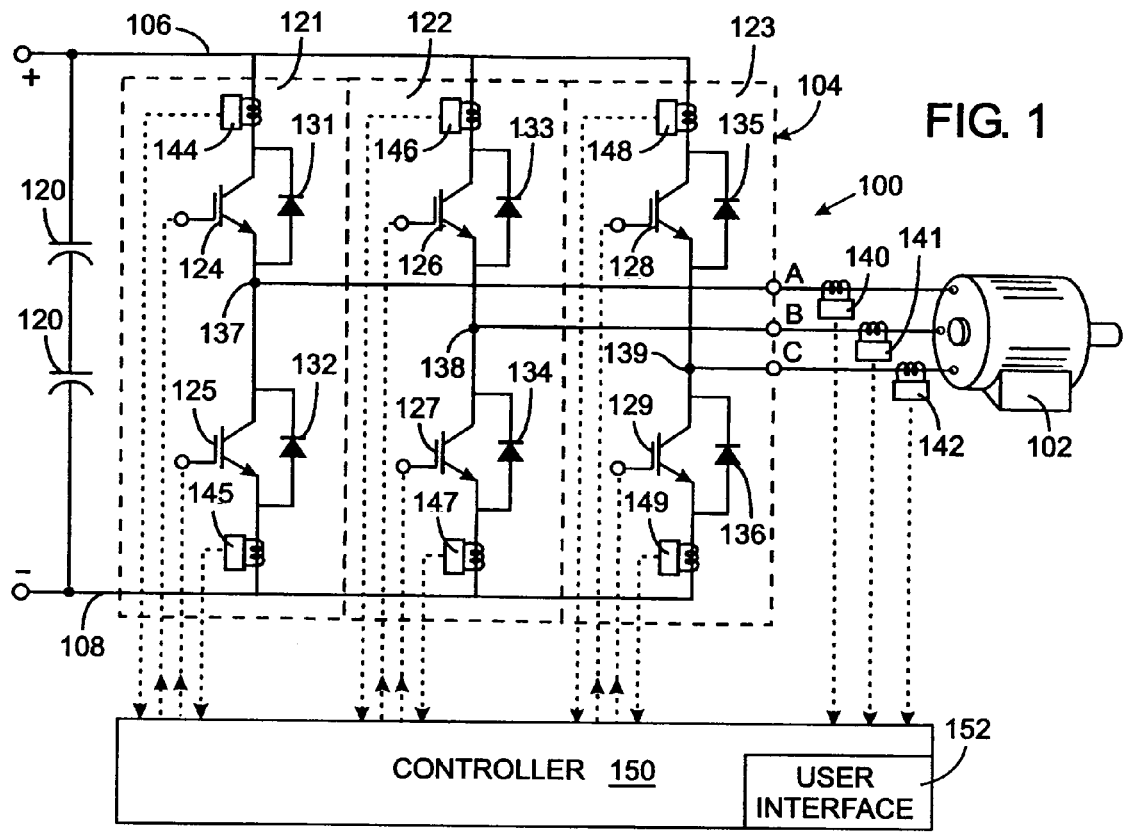
FIG. 1 is a schematic diagram of a three-phase power inverter that incorporates the present invention.

With initial reference to FIG. 1, a motor drive 100 includes an electrical power inverter 104 converts a DC supply voltage into an alternating voltage that drives a three-phase electric induction motor 102. The DC voltage is furnished across a pair of voltage supply buses 106 and 108, respectively, that are at a positive voltage and a negative voltage with respect to each other. A pair of capacitors 120 are connected in series between the positive and a negative voltage supply buses 106 and 108.

The inverter 104 has three phase branches 121, 122, and 123 for producing three-phase alternating current at output terminals A, B and C. Each phase branch 121–123 has two semiconductor switches 124, 125, 126, 127, 128, and 129, which are preferably switches conventionally used in motor drives, such as gate-turn-off devices or insulated gate bipolar transistors, for example. A diode 131, 132, 133, 134, 135, and 136 is connected in reverse parallel with each switch 124, 125, 126, 127, 128, and 129, respectively. Each output terminal A, B and C of the inverter 104 is connected to a node 137, 138 or 139 between the pair of switches 124–129 in a different one of the phase branches 121–123. Thus each phase branch 121–123 has one leg with a transistor/diode pair coupling the associated node 137–139 to the positive voltage supply bus 106 and another leg with a different switch/diode pair coupling that node to the negative voltage supply bus 108. Each transistor/diode pair can be considered as a bidirectional switch wherein the transistor, in a conductive state, conducts current in one direction and the diode conducts current in the opposite direction. The present inventive concept may be used with other types of bidirectional switches.

The switches 124–129 in the phase branches 121–123 are turned on and off by drive signals applied to their gates by a controller 150 thus placing the switch in a conductive or non-conductive state, respectively. Except for incorporating software to implement the present pole monitoring function, the controller 150 is identical to controllers used to control an inverter in previous motor drives and includes a microcomputer that executes software for operating the inverter 104 and performing other functions associated with the motor 102. A memory within the controller stores the software programs, as well as data used and generated by those programs. The controller 150 also includes a standard user interface 152.

A conventional set of three output current sensors 140, 141 and 142 measures the magnitude of current between the output terminals A, B and C and the motor 102 and produce an electrical signal indicating that current magnitude. Unique to the present power inverter 104 are six additional pole current sensors 144, 145, 146, 147, 148, and 149. One of these pole current sensors is located in each leg of the phase branches 121–123 to sense the current through the switch 124–129 or the diode 131–136 in that leg. The output signals from all the current sensors are applied as inputs to the controller 150.

Figure 2:
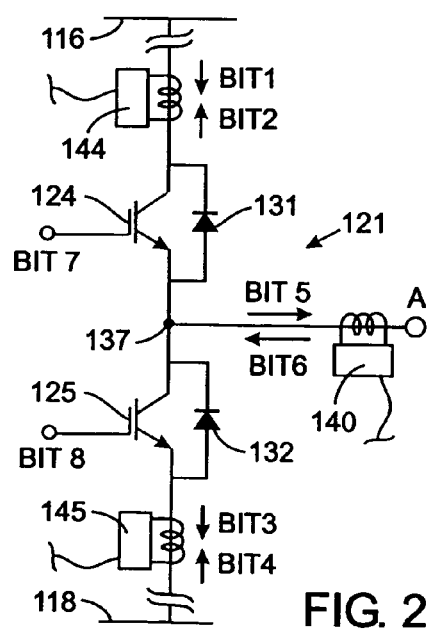
FIG. 2 depicts current sensing in one pole or phase branch of the power inverter.
Figure 3:
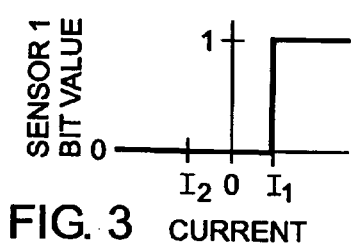
FIGS. 3 and 4 graphically illustrate the binary output signal from one current sensor in a leg of the power inverter.
Figure 4:
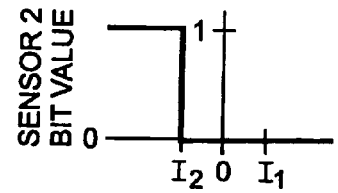

Each pole current sensor 144–149 produces an indication that comprises a pair of binary output bits denoting the direction of current in the respective leg of the associated phase branch. Each bit is considered as forming a separate signal. The operation of the present monitoring technique will be described with respect to the first phase branch 121 shown in detail in FIG. 2 with the understanding that the monitoring technique is duplicated independently for the other two phase branches 122 and 123. The indication from the first pole current sensor 144 has a pair of output bits designated BIT 1 and BIT 2. With additional reference to FIGS. 3 and 4, when current is in one direction via the first switch 124 between the positive voltage supply bus 106 and the first node 137 (defined as a positive current) and is greater than a predefined first threshold $I_1$, BIT 1 from the first pole current sensor 144 has a high logic level (i.e. a binary 1) and has a low logic level (i.e. a binary 0) at all other times. As used herein, a high logic level indicates a "true" logic condition and a low logic level indicates a "false" logic condition, however the logic levels may be reversed in a negative logic system. BIT 2 has a high logic level when current is in one direction via the first diode 131 between the positive voltage supply bus 106 and the first node 137 (defined as a negative current) and is greater than a predefined second threshold $I_2$, and has a low logic level at all other times. By comparing FIGS. 3 and 4, it is apparent that there is a dead band between the two current threshold levels $I_1$ and $I_2$ where both BIT 1 and BIT 2 are zero. The dead band provides hysteresis which ensures that the two output bits will never both be at a high logic level. The second pole current sensor 145 produces an indication having another pair of output bits, or signals, designated BIT 3 and BIT 4 when the current exceeds a similar pair of thresholds in the direction indicated by the arrow next to the respective bit label in FIG. 2.

The controller 150 also receives a signal from the first output current sensor 140 associated with output terminal A of the first phase branch 121. Although that signal indicates the magnitude of the current in that output terminal, the controller 150 compares that magnitude to positive and negative thresholds to produce a pair of binary logic levels, BIT 5 and BIT 6, that are similar to the bits produced by each pole current sensor 144 and 145. That is, BIT 5 has a high logic level when the current is in one direction between output terminal A and the motor 102 and is above a given threshold, and BIT 6 has a high logic level that current is in the opposite direction and exceeds a predefined threshold.

Another way of looking at the indications from the first and second pole current sensors 144 and 145 and the first output current sensor 140 is that each pair of bit signals may have three values. A first value (binary 00) indicates no electric current at the respective point in the circuit, a second value (binary 01) indicates electric current above the associated threshold in one direction, and a third value (binary 10) indicates electric current above the respective threshold in the opposite direction.

The pole monitoring also employs another pair of logic levels, designated BIT 7 and BIT 8. BIT 7 has a high logic level when the first switch 124 is commanded into a conductive state, and BIT 8 has a high logic level when the second switch 125 is commanded into a conductive state. These bits are produced by the controller 150 in response to the drive signals for those switches.

As the controller 150 activates the switches 124–129 in each phase branch to power the motor 102, the currents at each sensor 140–149 occur in well defined sequences. The sequences occurring in a given phase branch 121, 122 or 123, result in different combinations of the logic levels for the eight sensor signals, BIT 1 through BIT 8. The table in FIGS. 5A and 5B contains the 81 combinations of the current sensor logic levels that may possibly occur for a given phase branch. Although arithmetically there are 256 possible combinations of eight binary bit values, it will be appreciated that some of those combinations are physically impossible in the present sensing arrangement. For example, the two bits from a given sensor never can both be at a high logic level, as that could only occur if current exists simultaneously in both directions through the sensor. Likewise, the controller 150 never issues active gate control signals, BIT 7 and BIT 8, simultaneously to both switches in the same phase branch. Therefore, there are only 81 bit level patterns that can physically occur with the present monitoring technique. Even then, many of those possible current sensor bit combinations should not legitimately occur during normal operation of the power inverter and the occurrence of those combinations indicates a fault condition or malfunction of the power inverter 104.

In addition to executing a conventional software which controls the power inverter switches to produce pulse width modulated (PWM) electrical signals that operate the motor as desired, the controller 150 executes a routine that monitors the power inverter operation to detect malfunctions. In essence, the monitoring routine examines the sensor output bits to detect illegitimate combinations that indicate a failure condition. The examination also detects when a legitimate combination of sensor output bits occurs at the wrong time in the motor control sequence.

Figure 6:
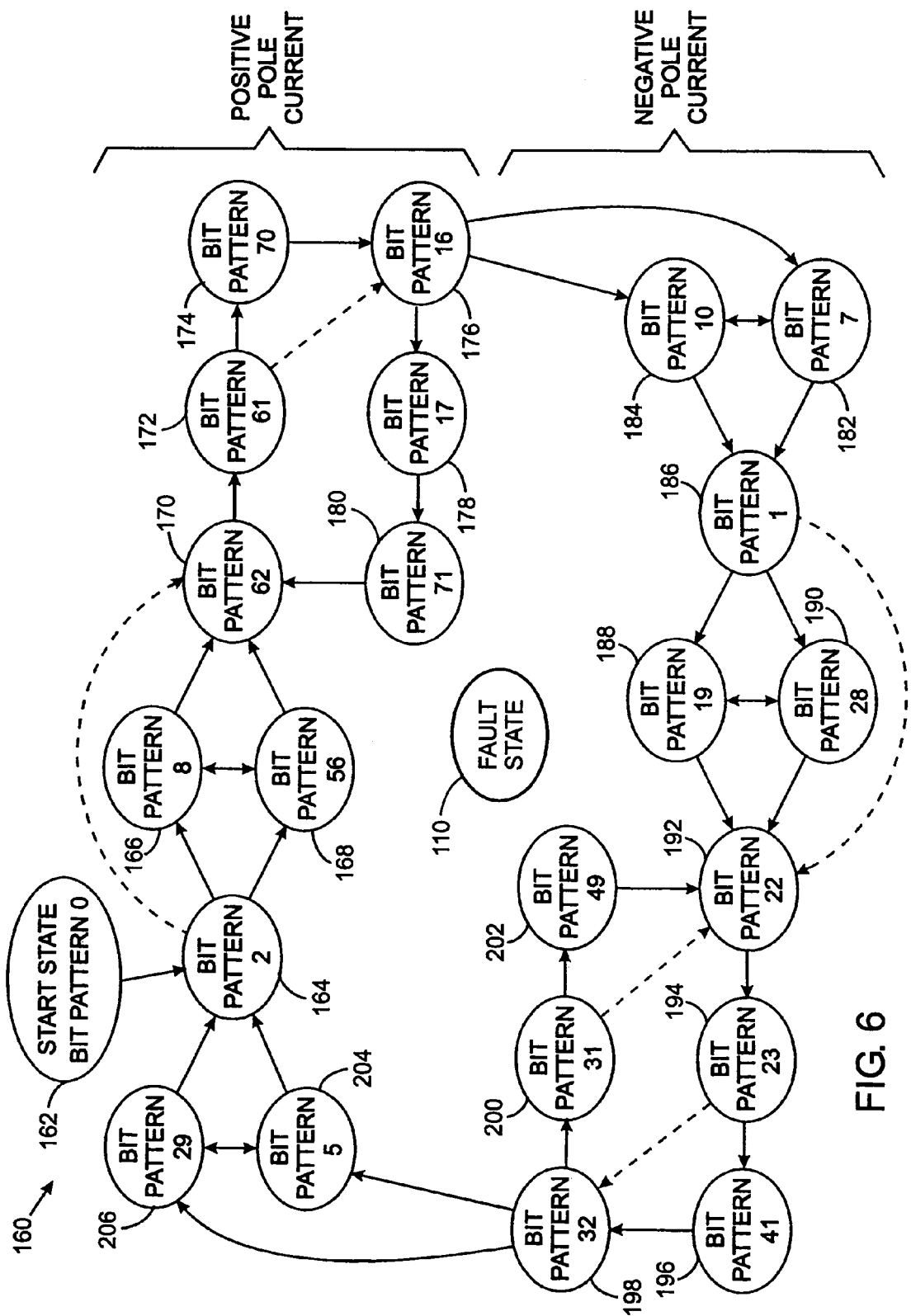
FIG. 6 is a state diagram of a monitoring algorithm implemented by the controller for one pole or phase branch of the power inverter.

The monitoring routine is implemented as a state machine that is depicted by the state diagram 160 in FIG. 6. A separate state machine is executed independently for each phase branch 121–123 of the power inverter 104. Therefore, the description of the state diagram 160 with respect to the first phase branch 121, as represented in detail in FIG. 2, will be described with the understanding that the functionality is duplicated two other times by the controller 150 for the other phase branches 122 and 123. Each state corresponds to one of the legitimate patterns of bits received by the controller 150 from the sensors 140, 144 and 145 for that phase branch and the bits indicating the commanded conductivity state of the semiconductor switches 124 and 125. In order for a transition to occur into a given state, the associated bit pattern must occur while the machine is in a designated previous state, as will be apparent from the following description of the state machine operation.

When power is first applied to the power inverter 104, the switches 124 and 125 are initially non-conductivity and current is not present in the first branch 121 (Start State 162). As a consequence, BITS 1–8 are all zero, corresponding to Bit Pattern 0 in the sensor output signal table of FIG. 5A. The state diagram 160 denotes the sequence in which the valid sensor bit patterns legitimately occur during normal operation of the power inverter 104. Therefore, the occurrence of a bit pattern which is not represented by one of these legitimate states or which occurs out of the proper sequence, indicates a malfunction of the power inverter. When one of these conditions occurs, a transition is made from the then present state to the Fault State 210 at which the controller 150 terminates all operation of the power inverter 104 and produces a warning indication to the machine operator via the user interface 152.

While in the Start State 162, the controller 150 begins to operate the power inverter 104 to apply positive pole current to the output terminal A of the first phase branch 121. Therefore, a transition occurs from the Start State 162 to state 164 when Bit Pattern 2 is detected. In state 164, the controller 150 has applied a drive signal to the gate of the first switch 124 (high logic level BIT 7), but as yet, current does not yet exist between the positive voltage supply bus 106 and node 137. This state occurs only momentarily and shortly before the switch becomes conductive. The controller 150 examines the sensor output bits every 100 nanoseconds. As the motor 102 is starting, a transition will occur from state 164 to state 168 in response to detecting Bit Pattern 56. This transition results from the first pole current sensor 144 detecting current, but before output current sensor 140 detects current in output terminal A, i.e. BIT 1 is one and both BITS 5 and 6 are zero. During subsequent operation of the power inverter, a transition may occur from state 164 to state 166 in which current is not yet detected by the first pole current sensor 144, but is detected by the first output current sensor 140 as still existing in output terminal A. Transitions may occur in either direction directly between states 166 and 168.

Eventually, current is detected by both the first pole current sensor 144 and the first output current sensor is 140, resulting in the production of Bit Pattern 62, causing a transition to state 170. The Bit Patterns 8 and 56 at states 166 and 168, respectively, occur for an extremely short time and may actually start and disappear within the 100 nanosecond cycle time of the controller 150. As a consequence, the controller may never observe either Bit Pattern 8 or 56, in which event a transition is made directly from state 164 to state 170, as indicated by the dashed transition line.

Commencing at state 170, the power inverter 104 generates a series of pulse width modulated (PWM) positive voltage pulses to produce a positive half-cycle of alternating current applied to the motor 102. Therefore from state 170, Bit Pattern 62 should occur next in which the first switch 124 is turned off (BIT 7=0) to terminate the positive voltage pulse and the second switch 125 should turn on (BIT 8=1). The instant the gate signals to the two switches 124 and 125 change, the current remains unchanged, however, that current changes momentarily thereafter producing Bit Pattern 70 for state 174. At this time, the apparatus begins to commutate in which current also exists in a path between the negative voltage supply bus 108 and the first node 137 via a second diode 132, thereby causing the second pole current sensor 145 to produce high logic level for BIT 4.

The commutation condition, in which currents exist between the node 137 and both legs of the first phase branch 121, should occur for less than one microsecond. Thus, the controller 150 starts a one microsecond timer upon entering state 170. If that timer elapses without another state transition occurring, a fault condition is declared and a transition is made to the fault state 210 Under normal conditions, a transition from commutation state 174 to the next state 176 in the sequence will occur before the timer elapses. It is further possible that commutation state 174 occurs for such a brief interval that controller 150 does not observe it, that is the state begins and ends within a 100 nanosecond controller cycle. In that event, a transition occurs directly from the previous state 172 to state 176 as indicated by the dashed line.

At state 176 in FIG. 6, the power inverter 104 is in a condition in which the second switch 125 is conductive, producing current between the negative voltage supply bus 108 and the first node 137, thereby reducing the magnitude of current in the output terminal A. Thereafter, a transition occurs to state 178 in response to the controller 150 turning off the second switch 125 (BIT 8=0) and turning on the first switch 124 (BIT 7=1) to apply another positive voltage pulse to the motor 102. Then, the occurrence of Bit Pattern 71 causes a transition to state 180 in response to another commutation condition in which current exists in both the first switch 124 and the second diode 132. Here too, the state machine normally should stay in state 180 for less than one microsecond. As a result, the controller 150 starts a one microsecond timer upon entering state 180, so that if a subsequent transition does occur within that interval, the state machine will enter fault state 210. Assuming that the commutation condition terminates in a normal fashion, a transition occurs back to state 170 in response to Bit Pattern 62. This completes PWM cycle for the positive half cycle of the current applied to the first output terminal A. During that positive half cycle, the monitoring program repeatedly loops through states 170–180 until the inverter is operated so that the current at output terminal A makes a zero crossing.

At the time of that zero crossing, a similar sequence of states occurs as just took place for the positive half cycle, except that current exists in the opposite direction, from the motor 102 into the first node 137 of the first phase branch 121. Initially in negative pole current section of the state diagram 160, current may still be occur in the output terminal A or through the second diode 132. As a consequence this section commences with a transition into either state 182 or 184 depending upon whether the controller 150 detects Bit Pattern 7 or Bit Pattern 10, respectively. Transitions can occur between states 182 and 184.

Soon thereafter, the currents in the first phase branch 121 disappear, even though the second switch 125 is still on, which results in the occurrence of Bit Pattern 1 and a transition to state 186. That change is followed by a subsequent transition to either state 188 or 190 (bit pattern 19 or 28), depending upon whether current exists in the second switch 125 (BIT 3=1) or in the first diode 131 (BIT 2=1). Eventually, current occurs in the first output terminal A via the second switch 125, as indicated by Bit Pattern 22 which produces a transition to state 192. If state 188 or 190 exists for such a brief time that the controller does not observe the associated bit patterns, a transition occurs directly from state 186 to state 192.

Commencing at state 192, the state diagram enters a loop in which negative PWM voltage pulses are applied to the first output terminal A to form the negative half cycle of the current applied to the motor 102. As with the loop during the positive half cycle, operation of the power inverter 104 causes the monitoring state machine to circle through states 192, 194, 196, 200 and 202 repeatedly during the negative half cycle. States 196 and 202 occur during commutation. Therefore, the controller 150 activates the one microsecond timer in these two states 196 and 202, so that if another transition does not occur within that interval, the state machine enters the fault state 210 and terminates operation of the power inverter 104.

The normal sequence of bit patterns causes the state machine to circle repeatedly through states 192–202 during the negative half cycle of the motor current. At the end of that half-cycle, operation of the power inverter 104 enters another positive half cycle resulting in a transition from state 198 to either state 204 or 206, depending upon the existence of Bit Pattern 5 or 29, respectively. Thereafter, a the state machine again enters state 164 in response to the existence of Bit Pattern 2, thereby repeating the cyclical monitoring of the first phase branch 121 of the power inverter 104.

While in a given state, occurrence of other than an expected bit pattern that may produce a legitimate transition to a subsequent state, the state machine monitor enters the fault state 210. For example, if a bit pattern that is not associated with a state on diagram 160 is found to exist, a fault condition is declared. In addition if bit pattern for a legitimate given state is found, but that given state is not a valid subsequent state for the present state in the defined sequence, a fault condition also will be declared. Thus, by defining the normal operation of the power inverter 104 as a state machine which operates through a well defined sequence of states, deviation from that sequence indicates the occurrence of a malfunction. Furthermore, each state is represented by a pattern of binary bits denoting current above a predefined threshold in a given direction at designated points of the phase branch, as opposed to the controller evaluating specific current magnitudes at those branch points.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. An apparatus for monitoring performance of a power converter that has a first switch connecting a first voltage bus to an output terminal and a second switch connecting a second voltage bus to the output terminal, the apparatus comprising:
   a first pole current sensor located in series with the first switch and producing a first indication of a direction of electric current between the first voltage bus and the output terminal;
   a second pole current sensor located in series with the second switch and producing a second indication of a direction of electric current between the second voltage bus and the output terminal;
   an output current sensor operably coupled to produce a third indication of a direction of electric current in the output terminal; and
   a controller that produces a first conductivity command for the first switch and a second conductivity command for the second switch, and an indication of a fault condition in response to the first indication, the second indication, the third indication, the first conductivity command, and the second conductivity command.

2. The apparatus as recited in claim 1 wherein the controller implements a state machine having a plurality of states, each defined by a pattern of the first indication, the second indication, the third indication, the first conductivity command, and the second conductivity command.

3. The apparatus as recited in claim 2 wherein the controller produces an indication of a fault condition when the first indication, the second indication, the third indication, the first conductivity command, and the second conductivity command fail to correspond to the pattern for any of the plurality of states.

4. The apparatus as recited in claim 2 wherein the state machine specifies a sequence in which the plurality of states occur, and controller produces the indication of a fault condition when that state machine is in a given state and the first indication, the second indication, the third indication, the first conductivity command, and the second conductivity command fail to correspond to the pattern for either the given state or a next state in the sequence.

5. The apparatus as recited in claim 1 wherein:
   the first indication from the first pole current sensor also indicates existence of electric current between the first voltage bus and the output terminal in excess of a first threshold level;
   the second indication from the second pole current sensor also indicates existence of electric current between the second voltage bus and the output terminal in excess of a second threshold level; and
   the third indication from the output current sensor also indicates existence of electric current in the output terminal in excess of a third threshold level.

6. The apparatus as recited in claim 1 wherein each of the first indication, the second indication, the third indication comprises two binary bits with one bit being true when the respective electric current exists in one direction and with another bit being true when the respective electric current exists in an opposite direction.

7. The apparatus as recited in claim 1 wherein each of the first indication, the second indication, and the third indication comprises two binary bits, wherein one bit is true when the respective electric current exists in a first direction in excess of aq first threshold level, and another bit is true when the respective electric current exists in a second direction in excess of a second threshold level.

8. The apparatus as recited in claim 7 wherein the first and second threshold levels are separated by a dead band in which electric current levels produce false values for both binary bits.

9. An apparatus for monitoring performance of a power converter which includes a first switch connecting a first voltage bus to an output terminal and a second switch connecting a second voltage bus to the output terminal, the apparatus comprising:

a first pole current sensor that produces a first signal when electric current in one direction between the first voltage bus and the output terminal exceeds a first threshold and produces a second signal when electric current in an opposite direction between the first voltage bus and the output terminal exceeds a second threshold;

a second pole current sensor that produces a third signal when electric current in one direction between the second voltage bus and the output terminal exceeds a third threshold and produces a fourth signal when electric current in an opposite direction between the second voltage bus and the output terminal bus exceeds a fourth threshold;

a output pole current sensor operably coupled to produce a fifth signal when electric current in one direction between the output terminal and a load connected to the power converter exceeds a fifth threshold, and to produce a sixth signal when electric current in an opposite direction between the output terminal and a load exceeds a sixth threshold; and a controller that generates fault indication denoting a malfunction of the power converter, wherein the fault indication is produced in response to the first signal, the second signal, the third signal, the fourth signal, the fifth signal, the sixth signal, a seventh signal whether the first switch is being commanded into a conductive state by the controller, and an eighth signal whether the second switch is being commanded into a conductive state by the controller.

10. The apparatus as recited in claim 9 wherein each of the first signal, the second signal, the third signal, the fourth signal, the fifth signal, the sixth signal, the seventh signal, and the eighth signal comprises a binary value.

11. The apparatus as recited in claim 10 wherein the controller implements a state machine having a sequence of a plurality of states, each state is defined by a pattern of the binary values of the first signal, the second signal, the third signal, the fourth signal, the fifth signal, the sixth signal, the seventh signal, and the eighth signal.

12. The apparatus as recited in claim 11 wherein the controller generates the fault indication when the binary values of the first signal, the second signal, the third signal, the fourth signal, the fifth signal, the sixth signal, the seventh signal, and the eighth signal fail to correspond to the pattern for any of the plurality of states.

13. The apparatus as recited in claim 11 wherein the controller generates the fault indication when that state machine is in a given state and the binary values of the first signal, the second signal, the third signal, the fourth signal, the fifth signal, the sixth signal, the seventh signal, and the eighth signal fail to correspond to the pattern for the given state or a next state in the sequence.

14. The apparatus as recited in claim 9 wherein:

the controller implements a state machine having a plurality of states, each defined by a pattern of the first signal, the second signal, the third signal, the fourth signal, the fifth signal, the sixth signal, the seventh signal, and the eighth signal; and the controller generates the fault indication when the first signal, the second signal, the third signal, the fourth signal, the fifth signal, the sixth signal, the seventh signal, and the eighth signal fail to correspond to the pattern for any of the plurality of states.

15. The apparatus as recited in claim 10 wherein:

the controller implements a state machine having a sequence of a plurality of states, each state is defined by a pattern of the first signal, the second signal, the third signal, the fourth signal, the fifth signal, the sixth signal, the seventh signal, and the eighth signal; and the controller generates the fault indication when that state machine is in a present state and the first signal, the second signal, the third signal, the fourth signal, the fifth signal, the sixth signal, the seventh signal, and the eighth signal fail to correspond to the pattern for the present state or a next state in the sequence.

16. A method for monitoring performance of a power converter which includes a first switch connecting a first voltage bus to an output terminal and a second switch connecting a second voltage bus to the output terminal, the method comprising:

producing a first signal which has a first value when electric current exists from the first voltage bus to the output terminal, and has a second value when electric current exists from the output terminal to the first voltage bus;

producing a second signal which has a third value when electric current above a third level exists from the second voltage bus to the output terminal, and has a fourth value when electric current above a fourth level exists from the output terminal to the second voltage bus;

producing a third signal which has a fifth value when electric current above a fifth level in the output terminal to a load, and has a sixth value when electric current above a sixth level in the output terminal;

producing a fourth signal indicating a commanded conductivity of the first switch;

producing a fifth signal indicating a commanded conductivity of the second switch; and generating a fault indication in response to the first signal, the second signal, the third signal, the fourth signal, and the fifth signal.

17. The method as recited in claim 16 further comprises implementing a state machine which designates a plurality of states, each defined by a pattern of values of the first signal, the second signal, the third signal, the fourth signal, and the fifth signal.

18. The method as recited in claim 17 wherein the fault indication is generated when the values of the first signal, the second signal, the third signal, the fourth signal, and the fifth signal fail to correspond to the pattern for any of the plurality of states.

19. The method as recited in claim 17 wherein the state machine specifies one or more transitions that may legitimately occur from each state to one or more subsequent states, and the fault indication is generated when state machine is in a present state and the values of the first signal, the second signal, the third signal, the fourth signal, and the fifth signal fail to correspond to the pattern for either the present state or any of the subsequent states to which a transition may legitimately occur from the present state.

20. The method as recited in claim 16 wherein each of the first signal, the second signal, and the third signal comprises two binary bits.

* * * * *